(12) United States Patent
Reynard

(10) Patent No.: US 6,812,613 B1
(45) Date of Patent: Nov. 2, 2004

(54) ELECTRIC MOTOR UNIT, IN PARTICULAR FOR MOTOR VEHICLE, INCORPORATING CONTROL ELECTRONICS

(75) Inventor: Christophe Reynard, Les Cars (FR)

(73) Assignee: Valeo Systemes D'Essuyage (FR)

( * ) Notice: Subject to any disclaimer, the term of this patent is extended or adjusted under 35 U.S.C. 154(b) by 0 days.

(21) Appl. No.: 09/647,906

(22) PCT Filed: Apr. 6, 1999

(86) PCT No.: PCT/FR99/00788

§ 371 (c)(1),
(2), (4) Date: Jan. 17, 2001

(87) PCT Pub. No.: WO99/52198

PCT Pub. Date: Oct. 14, 1999

(30) Foreign Application Priority Data

Apr. 6, 1998 (FR) .............................. 98 04256

(51) Int. Cl.[7] .............................................. H02K 13/00
(52) U.S. Cl. ..................................................... 310/239
(58) Field of Search ................................ 310/239, 241, 310/247, 64, 88, 89, 71, DIG. 6

(56) References Cited

U.S. PATENT DOCUMENTS

| | | | | |
|---|---|---|---|---|
| 4,420,706 A | * | 12/1983 | Siebold et al. ............... | 310/324 |
| 4,614,886 A | * | 9/1986 | Schneider et al. .......... | 310/239 |
| 5,006,744 A | * | 4/1991 | Archer et al. ................ | 310/89 |
| 5,070,267 A | * | 12/1991 | Sano et al. ................... | 310/89 |
| 5,196,750 A | * | 3/1993 | Strobl ......................... | 310/239 |
| 5,528,093 A | * | 6/1996 | Adam .......................... | 310/239 |
| 5,565,721 A | * | 10/1996 | Knappe ....................... | 310/156 |
| 5,650,676 A | * | 7/1997 | Blumenberg ................. | 310/88 |
| 6,459,181 B1 | | 10/2002 | Barrere ........................ | 310/68 |

FOREIGN PATENT DOCUMENTS

| | | |
|---|---|---|
| DE | 1 613 983 | 2/1968 |
| DE | 195 17 667 | 11/1996 |
| EP | 0 258 132 | 8/1987 |

* cited by examiner

Primary Examiner—Neil Abrams
(74) Attorney, Agent, or Firm—J. Gordon Lewis

(57) ABSTRACT

An electric motor unit of a motor vehicle includes a brush holder plate assembly. The plate assembly has a brass insert, a radiator, and an electronic card positioned adjacent the radiator. The plate assembly also includes a plastic over-molding molded to portions of the brass insert. An outer peripheral edge of the over-molding extends perpendicularly from a surface of the over-molding to surround at least a portion of the radiator.

17 Claims, 3 Drawing Sheets

ELECTRIC MOTOR UNIT, IN PARTICULAR FOR MOTOR VEHICLE, INCORPORATING CONTROL ELECTRONICS

BACKGROUND

This invention relates to an electric motor unit and an electronic control of the motor.

The electric motor unit proposed by the invention can be advantageously used in a motorized fan used for the heater and/or vent and/or air conditioner of a motor vehicle.

Historically, the stator of such a motor unit comprises a carbon holder plate (PPC) which includes a brass insert and a radiator.

The brass insert serves to guide the carbon holders and to bring the current closer to the foot of the MOSFET of the power circuit near the radiator.

The radiator, generally made of aluminum, provides cooling to the power components (diodes, MOSFET transistors) and provides a space into which several electronic components on a circuit board that has been imprinted with the control electronics are received and held.

A motor unit of this type was described in the French patent application that the Assignee filed under number 98 03128.

One aspect of the invention is that a motor unit structure provides for very high mounting tolerances between the radiator and the brass insert.

In another aspect of the invention, the rigidity and the watertightness of a motor unit structure has been improved.

It is a further aspect of the invention to provide a motor unit structure of which the means for connecting and the assembly of the components are simplified.

SUMMARY OF THE INVENTION

The present invention provides an electric motor unit of a motor vehicle having a brush carrier plate that includes a brass insert and a radiator, characterized by the plate having a plastic over-molding that surrounds the insert and the radiator. This over-molding provides make up for play between the parts.

Furthermore, the over-molding contributes to the rigidity of the plate, which allows optimization of the design of the radiator and the quantity of aluminum used for it, by removing from the radiator the parts that are not necessary for cooling and that only serve to increase the rigidity of the plate. Moreover, the over-molding also includes a partition that separates, in a watertight way, on the plate, the area designed to receive the electronic card and an area carrying the brushes.

The area that is delimited for the over-molding and which receives the card can furthermore be closed by a lid for which the edge of the over-molding defines a watertight plane.

The system of the over-molding and the lid defines, for the imprinted circuit card and the electronic components (in the cold area of the motor) a watertight housing in which the components are thermally isolated with respect to the area that carries the brushes (electrotechnical area—hot area). There is also a decoupling between the electronic area and the electrotechnical area.

The separation partition can advantageously provide means for respiration allowing circulation of air from one area to the other without allowing moisture in the electronic area.

BRIEF DESCRIPTION OF THE DRAWING

Other characteristics and advantages of the invention will become more clear in the following description. This description is purely illustrative and not limiting. It must be read in the light of the attached drawings in which.

DESCRIPTION OF THE PREFERRED EMBODIMENT

Figure 1:
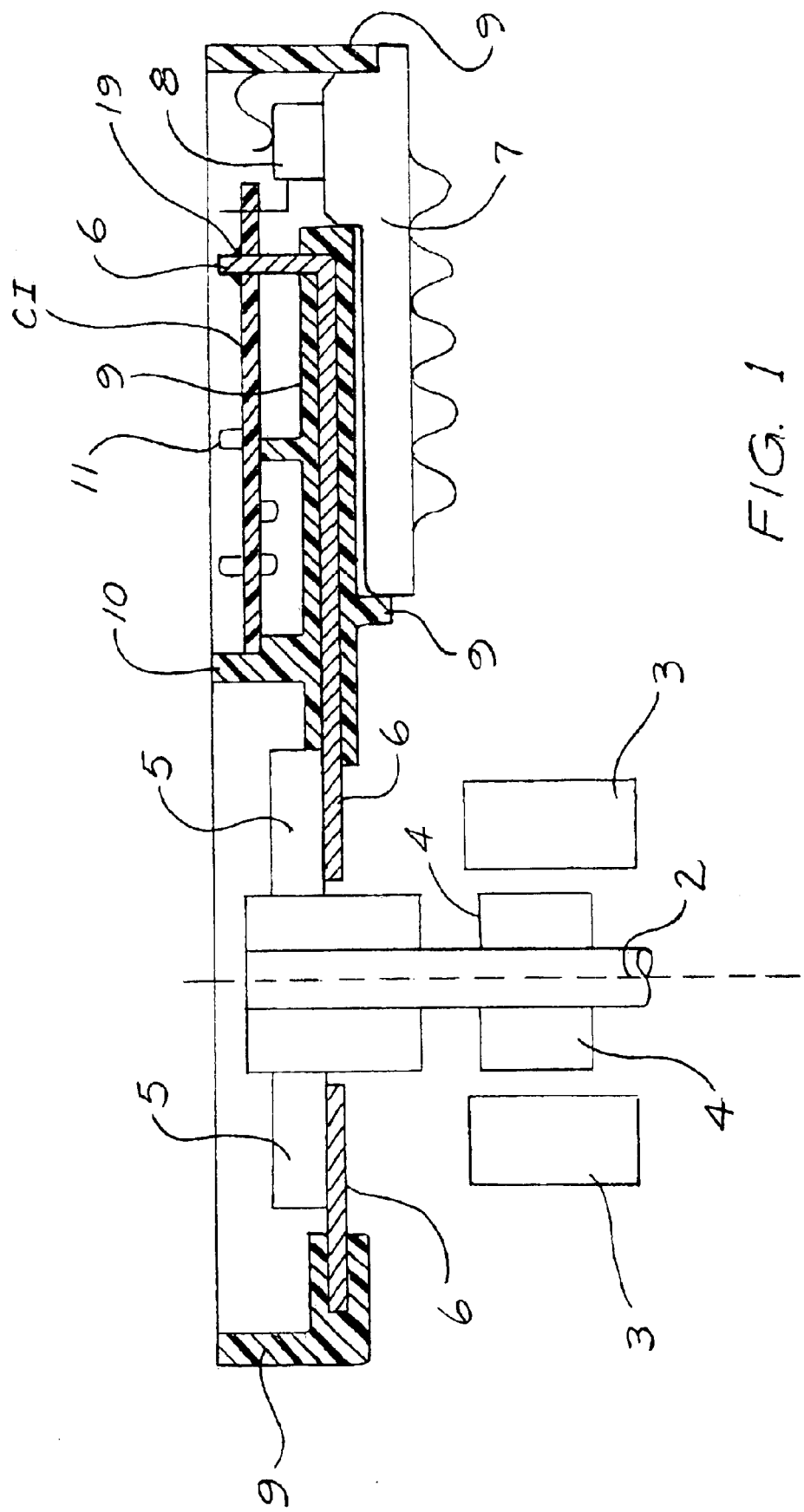
FIG. 1 is a cross-sectional schematic view of the motor unit according to one possible method of embodiment of the invention.
Figure 2:
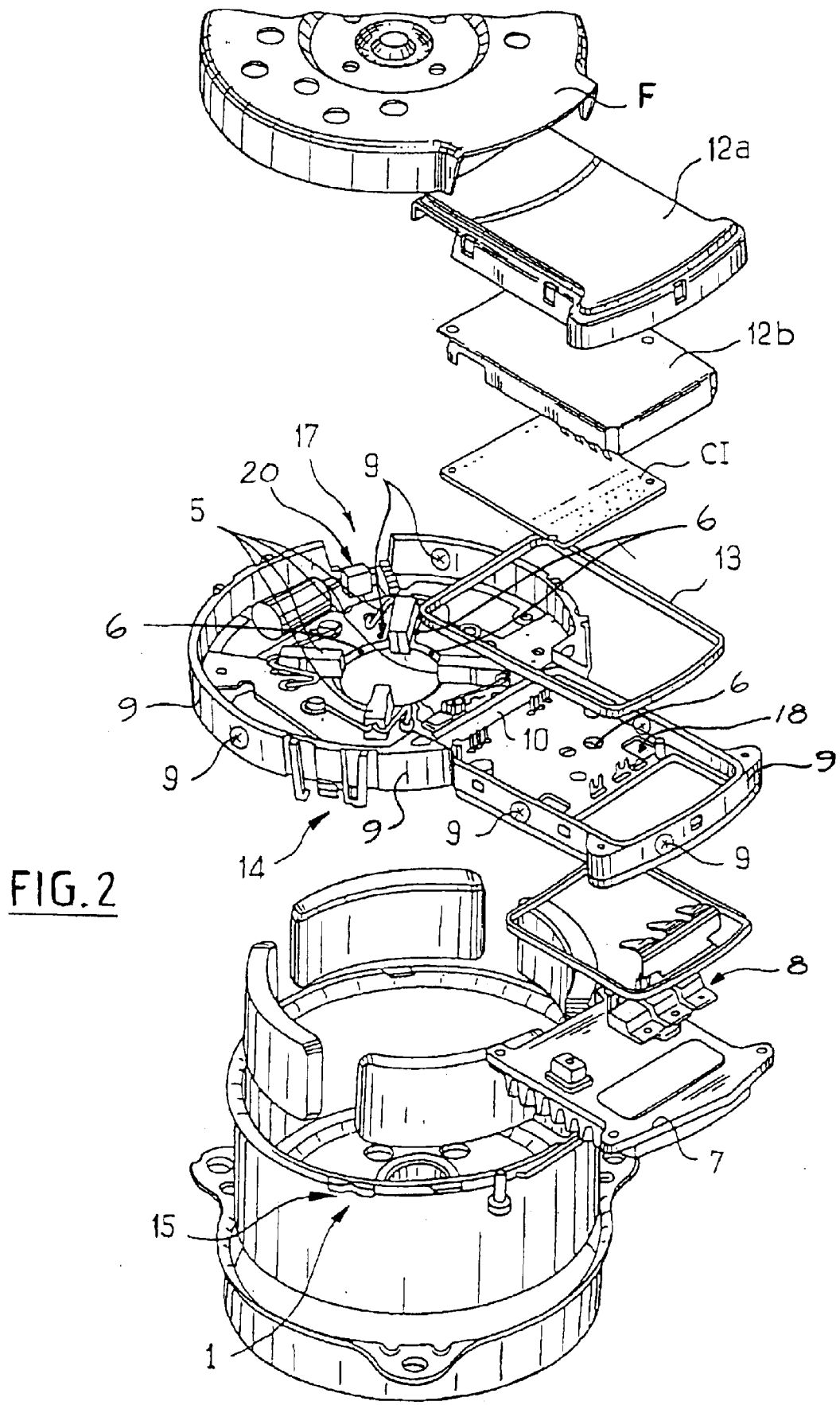
FIG. 2 is an exploded perspective view of a motor unit from FIG. 1.

The motor unit, which is shown in different levels of detail in the two embodiments in FIGS. 1 and 2, includes a housing 1, a rotational axis 2, a stator 3 fixed to the housing, and a rotor 4 powered by the brushes or carbons 5. These brushes 5 are guided by a brass insert 6 which has an electronic brush carrier plate (PPCE) that also includes a radiator 7.

On this radiator 7 are placed power components 8 (diodes, MOSFET transistors). A printed circuit card C I, which holds control components 11, is also placed adjacent this radiator 7.

The PPCE plate presents a over-molding 9 which surrounds the brass insert 6 and the radiator 7. This over-molding 9 also presents a partition 10 that separates, in a watertight manner, on the plate, the area that is designed to receive an electronic card C I, from the electrotechnical area that holds the brushes 5. The peripheral over-molding 9 and this partition 10 define, with a lid 12, a watertight housing into which is received the electronics card C I.

The peripheral over-molding 9 and the transversal partition 10 together define a watertight plane on which is received a gasket 13 that is designed to be compressed between the lid 12 and the edge of the over-molding 9. The lid 12 can include a plastic hood 12a formed from a plastic material into which a metallic-plated hood 12b is placed as shown in FIG. 2.

The printed circuit card C I is double-sided, having components extending from one side of the card to the other.

Recesses, such as recess 18, are provided on the over-molding for positioning and holding the components before soldering the components onto the card.

The power and control current is led to the electronic components (control components of the printed circuit card and power components (MOSFET, diodes) mounted on the radiator 7) by the path that is formed by the brass insert 6. The brass insert 6 is directly soldered with solder 19 to the printed circuit card or to the power components. Accordingly, one connecting step in the prior art between the printed circuit card C I and the brass insert 6 is removed. The connections between the brass insert 6 and the card C I are thus optimized, which provides a considerable reduction of heating of the surface of the electronic card.

The power components like the MOSFET transistors and the diodes are cooled by the aluminum radiator 7, which is fitted with wings placed in the external air flux.

The radiator 7, the plastic over-molding 9, and the lid are assembled in such a way to form a watertight housing 1 to the exterior, but also from the interior of the motor (thermal protection, protection from dust, protection from electro-magnetic rays, etc.)

The means allowing the removal of condensation produced by the radiator 7 in the housing 1 defined by the over-molding 9 and the lid 12 are advantageously provided by the watertight partition 10. Also, the over-molding 9 provides a gap 17 for the passage of the wires designed to power the brass insert 6. Particularly, the over-molding 9 allows the implantation of a connecting module designed to power the insert 6 and the electronic controls and allows the connection towards the exterior by a connector 20 having a complimentary form.

The electrotechnical part is closed by an end plate F.

Figure 3:
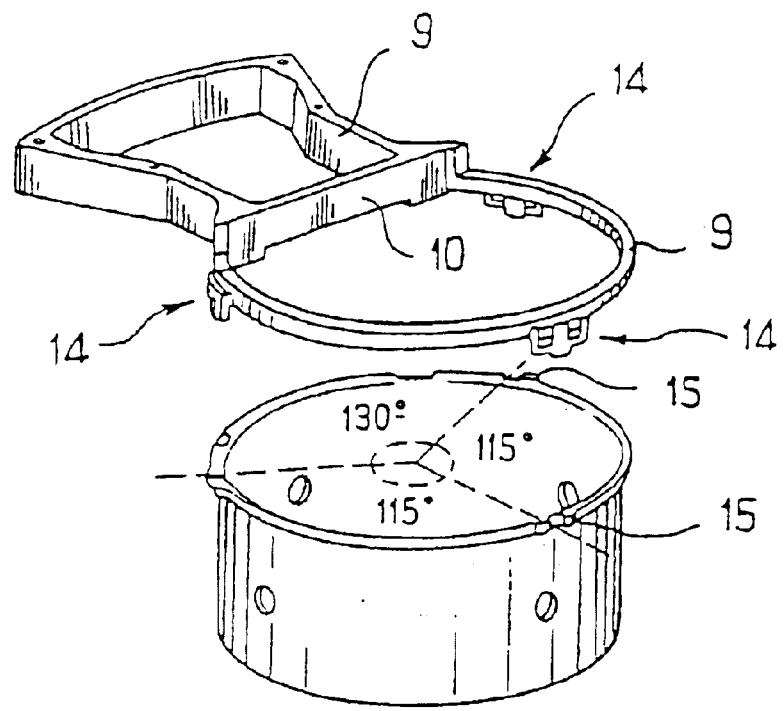
FIG. 3 is a partial, simplified perspective schematic view showing the mounting of a plate to a housing of a motor unit as discussed with respect to FIGS. 1 and 2.
Figure 4:
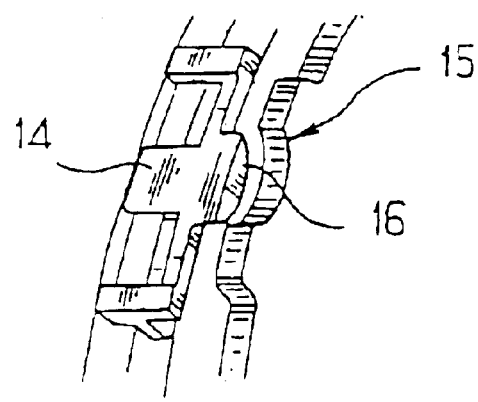
FIG. 4 is a detailed perspective view of the mechanical means of FIG. 3 for locking the plate with regard to the housing.

As seen in FIGS. 2 to 4, the over-molding 9 of the plate includes elastic attachment flaps 14 designed to work together with complimentary forms 15 which are embossed on the housing 1, for keeping the plate secured to the housing 1.

It is noted that one solution for attachment is particularly economical, typically, the means for mounting the plate to the housing 1 are made up of rolled-stapled sheet metal.

The elastic leads 14 and the complimentary forms 15 that are shown the housing 1 can be coupled in such a way to create a single possible relative position between the plate and the housing 1. For example, the flaps 14 and the forms 15 are angularly spaced, respectively, two by two at 115°, 115°, 130°.

As is shown in FIG. 4, the elastic flaps 14 end, can include chamfered protuberances 16 that facilitate the connection of the plate onto the housing 1 and assure, during mounting, the mechanical stability of the ensemble by avoiding the turning over the plate by the counterweight of the electronics that are incorporated into the motor.

What is claimed is:

1. An electric motor unit of a motor vehicle comprising:
   a brush holder plate assembly having a brass insert and a radiator, and an electronic card positioned adjacent the radiator wherein the plate assembly includes a plastic over-molding molded to portions of the brass insert; and wherein an outer peripheral edge of the over-molding extends perpendicularly from a surface of the over-molding to surround at least a portion of the radiator.

2. The motor unit according to claim 1, further comprising a partition separating an area of the over-molding designed to receive the electronic card from a zone of the over-molding designed to receive a brush.

3. The motor unit according to claim 2, further comprising:
   a lid designed to close the area that is delimited by the outer peripheral edge of the over-molding and the partition and which receives the electronic card.

4. The motor unit according to claim 1 wherein the brass insert is soldered to the printed circuit card.

5. The motor unit according to claim 2 wherein the over-molding includes recesses designed to receive the electronic card and components of the electronic card.

6. The motor unit according to claim 1, further comprising:
   elastic attachment flaps extending from the over-molding, the flaps operable to couple with complimentary forms in a housing of the motor unit.

7. The motor unit according to claim 6 wherein the elastic flaps and the complimentary forms are spaced to limit the relative position of the plate assembly and the housing.

8. The motor unit according to claim 1 wherein the over-molding includes a passage for wires designed to power the brass insert.

9. The motor unit according to claim 8, further comprising a connector operable to receive a connecting module designed to supply power the brass insert and the electronic card.

10. The motor unit of claim 1 wherein the motor unit is for a motorized fan group used in at least one of a heater and a fan and an air conditioning unit of a motor vehicle.

11. The motor unit according to claim 1 wherein the over-molding has at least one recess designed to receive a brush.

12. The motor unit of claim 2 wherein the partition allows circulation of air between the area and the zone and prevents moisture from entering the area from the zone.

13. The motor unit of claim 3 wherein the partition allows circulation of air between the area and the zone and prevents moisture from entering the area from the zone.

14. The motor unit according to claim 3, further comprising:
   a gasket fixedly mounted between the lid and facing surfaces of the over-molding and the partition.

15. The motor unit according to claim 3 wherein the lid comprises a first metallic hood facing the over-molding and the electronic card and second plastic hood enclosing the metallic-plated hood.

16. The motor unit according to claim 15, further comprising:
   an end plate enclosing the zone of the over-molding designed to receive the brush.

17. The motor unit according to claim 16 wherein the end plate includes a plurality of holes extending therethrough.

* * * * *